US012354551B2

(12) United States Patent
(10) Patent No.: US 12,354,551 B2
(45) Date of Patent: Jul. 8, 2025

Han et al.

(54) DISPLAY CONTROL METHOD, DISPLAY CONTROL UNIT AND DISPLAY DEVICE

(71) Applicant: BOE TECHNOLOGY GROUP CO., LTD., Beijing (CN)

(72) Inventors: Xinbin Han, Beijing (CN); Shiming Shi, Beijing (CN); Libin Liu, Beijing (CN); Guangliang Shang, Beijing (CN); Rui Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 18/027,254

(22) PCT Filed: Jun. 24, 2022

(86) PCT No.: PCT/CN2022/101048

§ 371 (c)(1),
(2) Date: Mar. 20, 2023

(87) PCT Pub. No.: WO2023/245605

PCT Pub. Date: Dec. 28, 2023

(65) Prior Publication Data

US 2024/0355294 A1 Oct. 24, 2024

(51) Int. Cl.
*G09G 3/3258* (2016.01)

(52) U.S. Cl.
CPC ... *G09G 3/3258* (2013.01); *G09G 2300/0819* (2013.01); *G09G 2300/0861* (2013.01); *G09G 2310/08* (2013.01); *G09G 2320/0233* (2013.01); *G09G 2320/0247* (2013.01); *G09G 2340/0435* (2013.01)

(58) Field of Classification Search
CPC ......... G09G 3/3258; G09G 2300/0819; G09G 2300/0861; G09G 2310/08; G09G 2320/0233; G09G 2320/0247; G09G 2340/0435; G09G 3/20; G09G 3/3233
See application file for complete search history.

(56) References Cited

U.S. PATENT DOCUMENTS

| | | | |
|---|---|---|---|
| 2017/0004766 A1 | 1/2017 | Cho et al. | |
| 2021/0287614 A1* | 9/2021 | Xiong | G09G 3/3291 |

FOREIGN PATENT DOCUMENTS

| | | |
|---|---|---|
| CN | 106328056 A | 1/2017 |
| CN | 111243480 A | 6/2020 |

(Continued)

OTHER PUBLICATIONS

Partial translation of Written Opinion on Application PCT/CN2022/101048 (Year: 2022).*

*Primary Examiner* — Julie Anne Watko
(74) *Attorney, Agent, or Firm* — WHDA, LLP

(57) ABSTRACT

The present disclosure provides a display control method, a display control unit and a display device. A display period includes a refresh stage and a maintaining stage arranged one after another in a case where a refresh rate of the display panel is decreased from a first refresh rate to a second refresh rate, the maintaining stage includes one or more light-emission control time periods independent of each other, and the display control method includes: at the maintaining stage, stopping receiving, by a plurality of pixel circuits arranged in rows in the display panel, a corresponding data voltage sequentially under the control of a corresponding written-in control signal.

17 Claims, 9 Drawing Sheets

(56) References Cited

FOREIGN PATENT DOCUMENTS

| | | | | | |
|---|---|---|---|---|---|
| CN | 113012643 | A | | 6/2021 | |
| CN | 113906495 | A | | 1/2022 | |
| CN | 114258320 | A | * | 3/2022 | ............... G09G 3/32 |
| KR | 20080063435 | A | | 7/2008 | |

* cited by examiner

| change fineness of the refresh rate at sequence 1 | | | change fineness of the refresh rate at sequence 2 | | |
|---|---|---|---|---|---|
| the quantities of scanning signal pulses | the quantities of light-emission control signal pulses | refresh rate | the quantities of scanning signal pulses | the quantities of light-emission control signal pulses | refres h rate |
| 1 | 2 | 80.00 | 1 | 1 | 96.00 |
| 2 | 4 | 60.00 | 2 | 2 | 80.00 |
| 3 | 6 | 48.00 | 3 | 3 | 68.57 |
| 4 | 8 | 40.00 | 4 | 4 | 60.00 |
| 5 | 10 | 34.29 | 5 | 5 | 53.33 |
| 6 | 12 | 30.00 | 6 | 6 | 48.00 |
| 7 | 14 | 26.67 | 7 | 7 | 43.64 |
| 8 | 16 | 24.00 | 8 | 8 | 40.00 |
| 9 | 18 | 21.82 | 9 | 9 | 36.92 |
| 10 | 20 | 20.00 | 10 | 10 | 34.29 |
| 11 | 22 | 18.46 | 11 | 11 | 32.00 |
| 12 | 24 | 17.14 | 12 | 12 | 30.00 |
| 13 | 26 | 16.00 | 13 | 13 | 28.24 |
| 14 | 28 | 15.00 | 14 | 14 | 26.67 |
| 15 | 30 | 14.12 | 15 | 15 | 25.26 |
| 16 | 32 | 13.33 | 16 | 16 | 24.00 |
| 17 | 34 | 12.63 | 17 | 17 | 22.86 |
| 18 | 36 | 12.00 | 18 | 18 | 21.82 |
| 19 | 38 | 11.43 | 19 | 19 | 20.87 |
| 20 | 40 | 10.91 | 20 | 20 | 20.00 |
| 21 | 42 | 10.43 | 21 | 21 | 19.20 |
| 22 | 44 | 10.00 | 22 | 22 | 18.46 |

Fig. 8

| the quantities of scanning signal pulses | the quantities of light-emission control signal pulses | refresh rate |
|---|---|---|
| 1 | 1 | 112.94 |
| 2 | 2 | 106.67 |
| 3 | 3 | 101.05 |
| 4 | 4 | 96.00 |
| 5 | 5 | 91.43 |
| 6 | 6 | 87.27 |
| 7 | 7 | 83.48 |
| 8 | 8 | 80.00 |
| 9 | 9 | 76.80 |
| 10 | 10 | 73.85 |
| 11 | 11 | 71.11 |
| 12 | 12 | 68.57 |
| 13 | 13 | 66.21 |
| 14 | 14 | 64.00 |
| 15 | 15 | 61.94 |
| 16 | 16 | 60.00 |
| 17 | 17 | 58.18 |
| 18 | 18 | 56.47 |
| 19 | 19 | 54.86 |
| 20 | 20 | 53.33 |
| 21 | 21 | 51.89 |
| 22 | 22 | 50.53 |
| 23 | 23 | 49.23 |
| 24 | 24 | 48.00 |

Fig. 9

DISPLAY CONTROL METHOD, DISPLAY CONTROL UNIT AND DISPLAY DEVICE

CROSS-REFERENCE TO RELATED APPLICATION

This application is the U.S. national phase of PCT Application No. PCT/CN2022/101048 filed on Jun. 24, 2022, which is incorporated by reference herein in its entirety.

TECHNICAL FIELD

The present disclosure relates to the field of display technology, in particular to a display control method, a display control unit and a display device.

BACKGROUND

An Organic Light-Emitting Diode (OLED) has different light-emitting principles from LCD (liquid crystal display). Due to such advantages as self-luminescence, wide viewing angle, almost infinite contrast, relatively low power consumption and extremely high response speed, OLED display technology has been widely used in a mobile display terminal.

During the operation of a display panel in the related art, when switching a refresh rate, e.g., a refresh rate of the display panel is decreased from a first refresh rate to a second refresh rate, a defect of large brightness difference occurs, and a display flicker phenomenon occurs.

SUMMARY

In one aspect, the present disclosure provides in some embodiments a display control method for a display panel. The display panel includes a plurality of pixel circuits arranged in rows, and each pixel circuit includes a light-emission control circuit, a driving circuit and a light-emitting element. A display period of the display panel includes a refresh stage and a maintaining stage arranged one after another in a case where a refresh rate of the display panel is decreased from a first refresh rate to a second refresh rate, the maintaining stage includes one or more light-emission control time periods independent of each other, and the display control method includes: at the refresh stage, receiving, by the plurality of pixel circuits arranged in rows in the display panel, a corresponding data voltage sequentially under the control of a corresponding written-in control signal; at the maintaining stage, stopping receiving, by the plurality of pixel circuits arranged in rows in the display panel, the corresponding data voltage sequentially under the control of the corresponding written-in control signal; and within each light-emission control time period, controlling, by the light-emission control circuit, a first terminal of the driving circuit to be electrically connected to a power source voltage terminal, and controlling a second terminal of the driving circuit to be electrically connected to the light-emitting element under the control of a corresponding light-emission control signal.

In a possible embodiment of the present disclosure, an absolute value of a difference between a frequency of the light-emission control signal and a first frequency is smaller than a predetermined frequency difference within the refresh stage and the maintaining stage, where the first frequency is a frequency of the light-emission control signal in the display period of the display panel when the refresh rate of the display panel is the first refresh rate.

In a possible embodiment of the present disclosure, the frequency of the light-emission control signal is equal to the first frequency within the refresh stage and the maintaining stage.

In a possible embodiment of the present disclosure, the pixel circuit further includes an on-off control circuit and a compensation control circuit, the on-off control circuit is electrically connected to an on-off control terminal, a control terminal of the driving circuit and a connection node, the compensation control circuit is electrically connected to a compensation control terminal, the connection node and the second terminal of the driving circuit, and the display control method further includes: at the maintaining stage, controlling, by the on-off control circuit, the control terminal of the driving circuit to be electrically disconnected from the connection node under the control of an on-off control signal from the on-off control terminal, and controlling, by the compensation control circuit, the connection node to be electrically disconnected from the second terminal of the driving circuit under the control of a compensation control signal from the compensation control terminal.

In a possible embodiment of the present disclosure, the pixel circuit further includes a first resetting circuit electrically connected to a scanning terminal, a first initial voltage terminal and a first electrode of the light-emitting element, the maintaining stage includes one or more set time periods in the case where the refresh rate of the display panel is decreased from the first refresh rate to the second refresh rate, and the display control method further includes: within each set time period, writing, by the first resetting circuit, a first initial voltage from the first initial voltage terminal into the first electrode of the light-emitting element under the control of a scanning signal.

In a possible embodiment of the present disclosure, the pixel circuit further includes a set circuit electrically connected to the scanning terminal, a set voltage terminal and the first terminal of the driving circuit, and the display control method further includes: within each set time period, writing, by the set circuit, a set voltage from the set voltage terminal into the first terminal of the driving circuit under the control of the scanning signal from the scanning terminal.

In a possible embodiment of the present disclosure, each set time period and each light-emission control time period are independent of each other, and the quantity of light-emission control time periods are N times of the quantity of set time periods, where N is a positive integer.

In a possible embodiment of the present disclosure, an absolute value of a difference between duration of the refresh stage and a first time is less than a predetermined time difference, and the first time is duration of the display period of the display panel when the refresh rate of the display panel is the first refresh rate.

In a possible embodiment of the present disclosure, light-emission control signals have a same waveform, and scanning signals have a same waveform within the refresh stage and the display period of the display panel when the refresh rate of the display panel is the first refresh rate.

In a possible embodiment of the present disclosure, the duration of the refresh stage is equal to the first time.

In a possible embodiment of the present disclosure, the pixel circuit further includes a set circuit, a first resetting circuit, a data written-in circuit, an energy storage circuit, a second resetting circuit, an on-off control circuit and a compensation control circuit, the refresh stage includes a first time period, a second time period, a third time period and a first light-emission stage arranged one after another, the first light-emission stage includes a first light-emission time period and a first resetting time period independent of each other, and the display control method further includes: within the first time period, writing, by the set circuit, a set voltage into the first terminal of the driving circuit under the control of a scanning signal, writing, by the second resetting circuit, a second initial voltage into a connection node under the control of the scanning signal, controlling, by the on-off control circuit, the connection node to be electrically connected to a control terminal of the driving circuit under the control of an on-off control signal, to write the second initial voltage into the control terminal of the driving circuit, and writing, by the first resetting circuit, a first initial voltage into a first electrode of the light-emitting element under the control of the scanning signal; within the second time period, writing, by the data written-in circuit, the data voltage into the first terminal of the driving circuit under the control of the written-in control signal, controlling, by the compensation control circuit, the connection node to be electrically connected to the second terminal of the driving circuit under the control of a compensation control signal, and controlling, by the on-off control circuit, the connection node to be electrically connected to the control terminal of the driving circuit under the control of the on-off control signal; at the beginning of the second time period, controlling, by the driving circuit, the first terminal of the driving circuit to be electrically connected to the second terminal of the driving circuit under the control of a potential at the control terminal of the driving circuit, to charge the energy storage circuit via the data voltage, thereby to change the potential at the control terminal of the driving circuit until the driving circuit is turned off; within the third time period, writing, by the set circuit, the set voltage into the first terminal of the driving circuit under the control of the scanning signal, and writing, by the first resetting circuit, the first initial voltage into the first electrode of the light-emitting element under the control of the scanning signal; within the first light-emission time period, controlling, by the light-emission control circuit, the first terminal of the driving circuit to be electrically connected to the power source voltage terminal under the control of the corresponding light-emission control signal, and controlling the second terminal of the driving circuit to be electrically connected to the light-emitting element, and driving, by the driving circuit, the light-emitting element to emit light; and within the first resetting time period, writing, by the set circuit, the set voltage from a set voltage terminal into the first terminal of the driving circuit under the control of the scanning signal from a scanning terminal, and writing, by the first resetting circuit, the first initial voltage into the first electrode of the light-emitting element under the control of the scanning signal.

In another aspect, the present disclosure provides in some embodiments a display control unit for a display panel. The display panel includes a plurality of pixel circuits arranged in rows, and each pixel circuit includes a light-emission control circuit, a driving circuit and a light-emitting element. A display period of the display panel includes a refresh stage and a maintaining stage arranged one after another in a case where a refresh rate of the display panel is decreased from a first refresh rate to a second refresh rate, the maintaining stage includes one or more light-emission control time periods independent of each other, and the display control unit includes a display control circuit. The display control circuit is configured to, by controlling a written-in control signal, enable the plurality of pixel circuits arranged in rows in the display panel to sequentially receive a corresponding data voltage under the control of the corresponding written-in control signal at the refresh stage. The display control circuit is further configured to, by controlling the written-in control signal, enable the plurality of pixel circuits arranged in rows in the display panel to stop receiving the corresponding data voltage under the control of the corresponding written-in control signal at the maintaining stage, and by controlling a light-emission control signal, enable the light-emission control circuit to control a first terminal of the driving circuit to be electrically connected to a power source voltage terminal and control a second terminal of the driving circuit to be electrically connected to the light-emitting element under the control of the corresponding light-emission control signal within each light-emission control time period.

In a possible embodiment of the present disclosure, the pixel circuit further includes an on-off control circuit and a compensation control circuit, the on-off control circuit is electrically connected to an on-off control terminal, a control terminal of the driving circuit and a connection node, and the compensation control circuit is electrically connected to a compensation control terminal, the connection node and the second terminal of the driving circuit. The display control circuit is further configured to, by controlling an on-off control signal and a compensation control signal, enable the on-off control circuit to control the control terminal of the driving circuit to be electrically disconnected from the connection node under the control of the on-off control signal, and enable the compensation control circuit to control the connection node to be electrically disconnected from the second terminal of the driving circuit under the control of the compensation control signal at the maintaining stage.

In a possible embodiment of the present disclosure, the pixel circuit further includes a set circuit and a first resetting circuit, the set circuit is electrically connected to a scanning terminal, a set voltage terminal and the first terminal of the driving circuit, the first resetting circuit is electrically connected to the scanning terminal, a first initial voltage terminal and a first electrode of the light-emitting element, the maintaining stage includes one or more set time periods in the case where the refresh rate of the display panel is decreased from the first refresh rate to the second refresh rate. The display control circuit is further configured to, by controlling a scanning signal, enable the set circuit to write a set voltage from the set voltage terminal into the first terminal of the driving circuit under the control of the scanning signal, and enable the first resetting circuit to write a first initial voltage from the first initial voltage terminal into the first electrode of the light-emitting element under the control of the scanning signal within each set time period.

In yet another aspect, the present disclosure provides in some embodiments a display device including the above-mentioned display control unit.

BRIEF DESCRIPTION OF THE DRAWINGS

FIG. 8 is a correspondence table between the quantities of scanning signal pulses and the quantities of light-emission control signal pulses inserted into the maintaining stage and the refresh rates;

FIG. 9 is another correspondence table between the quantities of scanning signal pulses and the quantities of light-emission control signal pulses inserted into the maintaining stage and the refresh rates.

DETAILED DESCRIPTION

Figure 1:
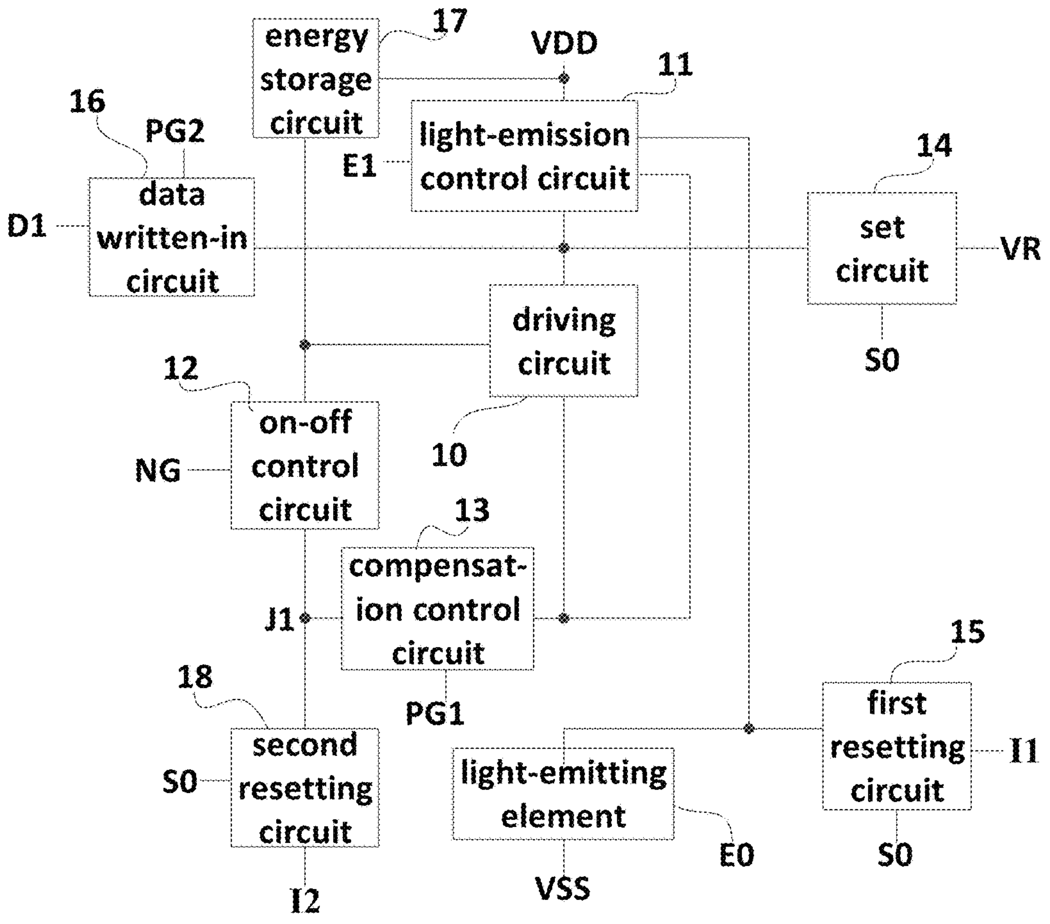
FIG. 1 is a schematic view showing a pixel circuit in a display device according to at least one embodiment of the present disclosure.

The technical solutions in the embodiments of the present disclosure will be described hereinafter clearly and completely with reference to the drawings of the embodiments of the present disclosure. Apparently, the following embodiments merely relate to a part of, rather than all of, the embodiments of the present disclosure, and based on these embodiments, a person of ordinary skill in the art may, without any creative effort, obtain other embodiments, which also fall within the scope of the present disclosure.

In the embodiments of the present disclosure, each transistor maybe a thin film transistor (TFT), a field effect transistor (FET), or any other element having a same characteristic. In order to differentiate two electrodes of the transistor, apart from a control electrode, from each other, one of the two electrodes may be called as a first electrode, and the other may be called as a second electrode.

In actual use, when the transistor is a TFT or FET, the control electrode may be a gate electrode, the first electrode may be a drain electrode and the second electrode may be a source electrode, or the control electrode may be a gate electrode, the first electrode may be a source electrode and the second electrode may be a drain electrode.

The present disclosure provides in some embodiments a display control method for a display panel. The display panel includes a plurality of pixel circuits arranged in rows, and each pixel circuit includes a light-emission control circuit, a driving circuit and a light-emitting element A display period of the display panel includes a refresh stage and a maintaining stage arranged one after another in a case where a refresh rate of the display panel is decreased from a first refresh rate to a second refresh rate, the maintaining stage includes one or more light-emission control time periods independent of each other, and the display control method includes: at the refresh stage, receiving, by the plurality of pixel circuits arranged in rows in the display panel, a corresponding data voltage sequentially under the control of a corresponding written-in control signal; at the maintaining stage, stopping receiving, by the plurality of pixel circuits arranged in rows in the display panel, the corresponding data voltage sequentially under the control of the corresponding written-in control signal; and within each light-emission control time period, controlling, by the light-emission control circuit, a first terminal of the driving circuit to be electrically connected to a power source voltage terminal, and controlling a second terminal of the driving circuit to be electrically connected to the light-emitting element under the control of a corresponding light-emission control signal.

In the display control method according to the embodiments of the present disclosure, when the refresh rate of the display panel is decreased from the first refresh rate to the second refresh rate, the display period is further provided with the maintaining stage after the refresh stage, so as to increase the duration of the display period. The pixel circuits in the display panel do not receive the corresponding data voltage at the maintaining stage, so it is able to control a frequency of the light-emission control signal to change slightly or not to change when the refresh rate of the display panel changes, thereby to use a same gamma setting, ensure that there is little or no change in the brightness of the display panel when the refresh rate changes, and mitigate the flicker phenomenon during the switching of the refresh rate.

In at least one embodiment of the present disclosure, an absolute value of a difference between a frequency of the light-emission control signal and a first frequency is smaller than a predetermined frequency difference within the refresh stage and the maintaining stage, where the first frequency is a frequency of the light-emission control signal in the display period of the display panel when the refresh rate of the display panel is the first refresh rate.

During the implementation, the frequency of the light-emission control signal may be set to be substantially the same as the first frequency within the refresh stage and the maintaining stage, and the first frequency is the frequency of the light-emission control signal in the display period of the display panel when the refresh rate of the display panel is the first refresh rate.

In at least one embodiment of the present disclosure, the frequency of the light-emission control signal is equal to the first frequency within the refresh stage and the maintaining stage.

Preferably, the frequency of the light-emission control signal is the same as the first frequency within the refresh stage and the maintaining stage.

In a possible embodiment of the present disclosure, the pixel circuit further includes an on-off control circuit and a compensation control circuit, the on-off control circuit is electrically connected to an on-off control terminal, a control terminal of the driving circuit and a connection node, the compensation control circuit is electrically connected to a compensation control terminal, the connection node and the second terminal of the driving circuit, and the display control method further includes: at the maintaining stage, controlling, by the on-off control circuit, the control terminal of the driving circuit to be electrically disconnected from the connection node under the control of an on-off control signal from the on-off control terminal, and controlling, by the compensation control circuit, the connection node to be electrically disconnected from the second terminal of the driving circuit under the control of a compensation control signal from the compensation control terminal.

During the implementation, the pixel circuit may further include the on-off control circuit and the compensation control circuit, at the maintaining stage, the on-off control circuit, under the control of the on-off control signal, controls the control terminal of the driving circuit to be electrically disconnected from the connection node, and the compensation control circuit, under the control of the compensation control signal, controls the connection node to be electrically disconnected from the second terminal of the driving circuit, so as to control the control terminal of the driving circuit to be electrically disconnected from the second terminal of the driving circuit, thereby to maintain a potential at the control terminal of the driving circuit.

In a possible embodiment of the present disclosure, the pixel circuit further includes a first resetting circuit electrically connected to a scanning terminal, a first initial voltage terminal and a first electrode of the light-emitting element, the maintaining stage includes one or more set time periods in the case where the refresh rate of the display panel is decreased from the first refresh rate to the second refresh rate, and the display control method further includes: within each set time period, writing, by the first resetting circuit, a first initial voltage from the first initial voltage terminal into the first electrode of the light-emitting element under the control of a scanning signal.

During the implementation, the pixel circuit may further include the first resetting circuit, and the maintaining stage includes the set time period within which the first resetting circuit, under the control of the scanning signal, writes the first initial voltage from the first initial voltage terminal into the first electrode of the light-emitting element, so as to set a potential at the first electrode of the light-emitting element.

In the related art, due to the presence of a parasitic capacitance of the light-emitting element, potentials maintained by the parasitic capacitance are different within the refresh stage and the maintaining stage, so that brightness difference occurs when the light-emission control circuit controls the first terminal of a driving circuit to be electrically connected to the power supply voltage terminal under the control of the corresponding light-emission control signal, and controls the second terminal of the driving circuit to be electrically connected to the light-emitting element, thereby to generate the flicker phenomenon when switching among different refresh rates. Therefore, in at least one embodiment of the present disclosure, when the refresh rate changes, the maintaining stage is provided with at least one set time period within which the first resetting circuit writes the first initial voltage into the first electrode of the light-emitting element, so as to reduce the brightness difference during the switching of the refresh rate, and mitigate the flicker phenomenon.

In at least one embodiment of the present disclosure, the pixel circuit further includes a set circuit electrically connected to the scanning terminal, a set voltage terminal and the first terminal of the driving circuit, and the display control method further includes: within each set time period, writing, by the set circuit, a set voltage from the set voltage terminal into the first terminal of the driving circuit under the control of the scanning signal from the scanning terminal.

During the implementation, the pixel circuit may further include the set circuit, so as to write the set voltage into the first terminal of the driving circuit within the set time period, thereby to set a potential at the first terminal of the driving circuit.

In a possible embodiment of the present disclosure, each set time period and each light-emission control time period are independent of each other, and the quantity of light-emission control time periods are N times of the quantity of set time periods, where N is a positive integer.

For example, N may be, but not limited to, 1 or 2.

In at least one embodiment of the present disclosure, through adjusting the quantity of pulses of the light-emission control signal and the quantity of pulses of the scanning signal inserted into the maintaining stage, it is able to change a waveform of the scanning signal, and provide the change fineness of the refresh rate, thereby to be applied to more application scenarios, reduce the overall power consumption of the display panel in the display device, and prolong a normal service time of the display panel.

In at least one embodiment of the present disclosure, the refresh stage includes a first light-emission stage including a first light-emission time period and a first resetting time period independent of each other, and the display control method includes: within the first light-emission time period, controlling, by the light-emission control circuit, the first terminal of the driving circuit to be electrically connected to the power source voltage terminal under the control of the corresponding light-emission control signal, and controlling the second terminal of the driving circuit to be electrically connected to the light-emitting element, and driving, by the driving circuit, the light-emitting element to emit light; and within the first resetting time period, writing, by the set circuit, the set voltage from a set voltage terminal into the first terminal of the driving circuit under the control of the scanning signal from a scanning terminal, and writing, by the first resetting circuit, the first initial voltage into the first electrode of the light-emitting element under the control of the scanning signal.

In at least one embodiment of the present disclosure, when the refresh rate of the display panel is the first refresh rate, the display period incluides a second light-emission stage including a second light-emission time period and a second resetting time period independent of each other, and the display control method includes: within the second light-emission time period, controlling, by the light-emission control circuit, under the control of the corresponding light-emission control signal, the first terminal of the driving circuit to be electrically connected to the power source voltage terminal, and controlling the second terminal of the driving circuit to be electrically connected to the light-emitting element, and driving, by the driving circuit, the light-emitting element to emit light; within the second resetting time period, writing, by the set circuit, the set voltage from the set voltage terminal into the first terminal of the driving circuit under the control of the scanning signal from the scanning terminal, and writing, by the first resetting circuit, the first initial voltage into the first electrode of the light-emitting element under the control of the scanning signal.

In a possible embodiment of the present disclosure, an absolute value of a difference between duration of the refresh stage and a first time is less than a predetermined time difference, and the first time is duration of the display period of the display panel when the refresh rate of the display panel is the first refresh rate.

During the implementation, the duration of the refresh stage after the switching of the refresh stage may be substantially equal to the duration of the display period before the switching of the refresh rate, and each control signal within the refresh stage may have a substantially same waveform as each control signal in the display period before the switching of the refresh rate, so as to mitigate the flicker phenomenon during the switching of the refresh rate.

In at least one embodiment of the present disclosure, the duration of the refresh stage is equal to the first time.

Preferably, the duration of the refresh stage is equal to the duration of the display period of the display panel when the refresh rate of the display panel is the first refresh rate.

In a possible embodiment of the present disclosure, the pixel circuit further include a set circuit, a first resetting circuit, a data written-in circuit, an energy storage circuit, a second resetting circuit, an on-off control circuit and a compensation control circuit, the refresh stage includes a first time period, a second time period and a third time period arranged one after another, the third time period is before the first light-emission stage, and the display control method further includes: within the first time period, writing, by the set circuit, a set voltage into the first terminal of the driving circuit under the control of a scanning signal, writing, by the second resetting circuit, a second initial voltage into a connection node under the control of the scanning signal, controlling, by the on-off control circuit, the connection node to be electrically connected to a control terminal of the driving circuit under the control of an on-off control signal, to write the second initial voltage into the control terminal of the driving circuit, and writing, by the first resetting circuit, a first initial voltage into a first electrode of the light-emitting element under the control of the scanning signal; within the second time period, writing, by the data written-in circuit, the data voltage into the first terminal of the driving circuit under the control of the written-in control signal, controlling, by the compensation control circuit, the connection node to be electrically connected to the second terminal of the driving circuit under the control of a compensation control signal, and controlling, by the on-off control circuit, the connection node to be electrically connected to the control terminal of the driving circuit under the control of the on-off control signal; at the beginning of the second time period, controlling, by the driving circuit, the first terminal of the driving circuit to be electrically connected to the second terminal of the driving circuit under the control of a potential at the control terminal of the driving circuit, to charge the energy storage circuit via the data voltage, thereby to change the potential at the control terminal of the driving circuit until the driving circuit is turned off; within the third time period, writing, by the set circuit, the set voltage into the first terminal of the driving circuit under the control of the scanning signal, and writing, by the first resetting circuit, the first initial voltage into the first electrode of the light-emitting element under the control of the scanning signal.

As shown in FIG. 1, the pixel circuit may include a light-emission control circuit 11, a driving circuit 10, a light-emitting element E0, an on-off control circuit 12, a compensation control circuit 13, a set circuit 14, a first resetting circuit 15, a data written-in circuit 16, an energy storage circuit 17 and a second resetting circuit 18.

The light-emission control circuit 11 is electrically connected to a light-emission control terminal E1, a first terminal of the driving circuit 10, a power source voltage terminal VDD, a second terminal of the driving circuit 10 and a first electrode of the light-emitting element E0, and configured to control the first terminal of the driving circuit 10 to be electrically connected to, or electrically disconnected from, the power source voltage terminal VDD, and control the second terminal of the driving circuit 10 to be electrically connected to, or electrically disconnected from, the first electrode of the light-emitting element E0 under the control of a light-emission control signal from the light-emission control terminal E1, and a second electrode of the light-emitting element E0 is electrically connected to a low voltage terminal VSS.

The on-off control circuit 12 is electrically connected to an on-off control terminal NG, a control terminal of the driving circuit 10 and a connection node J1, and configured to control the control terminal of the driving circuit 10 to be electrically connected to, or electrically disconnected from, the connection node J1 under the control of an on-off control signal from the on-off control terminal NG.

The compensation control circuit 13 is electrically connected to a compensation control terminal PG1, the connection node J1 and the second terminal of the driving circuit 10, and configured to control the connection node J1 to be electrically connected to, or electrically disconnected from, the second terminal of the driving circuit 10 under the control of a compensation control signal from the compensation control terminal PG.

The first resetting circuit 15 is electrically connected to a scanning terminal S0, a first initial voltage terminal I1 and the first electrode of the light-emitting element E0, and configured to write a first initial voltage Vi1 from the first initial voltage terminal I1 into the first electrode of the light-emitting element E0 under the control of a scanning signal from the scanning terminal S0.

The set circuit 14 is electrically connected to the scanning terminal S0, a set voltage terminal VR and the first terminal of the driving circuit 10, and configured to write a set voltage Vref from the set voltage terminal VR into the first terminal of the driving circuit 10 under the control of the scanning signal from the scanning terminal S0.

The data written-in circuit 16 is electrically connected to a written-in control terminal PG2, a data line D1 and the first terminal of the driving circuit 10, and configured to write a data voltage Vdata from the data line D1 into the first terminal of the driving circuit 10 under the control of a written-in control signal from the written-in control terminal PG2.

A first terminal of the energy storage circuit 17 is electrically connected to the control terminal of the driving circuit 10, a second terminal of the energy storage circuit 17 is electrically connected to the power source voltage terminal VDD, and the energy storage circuit 17 is configured to store electric energy.

The second resetting circuit 18 is electrically connected to the scanning terminal S0, a second initial voltage terminal I2 and the connection node J1, and configured to write a second initial voltage Vi2 from the second initial voltage terminal I2 into the connection node J1 under the control of the scanning signal.

In at least one embodiment of the present disclosure, the compensation control terminal PG1 and the written-in control terminal PG2 may be a same control terminal.

Figure 2:
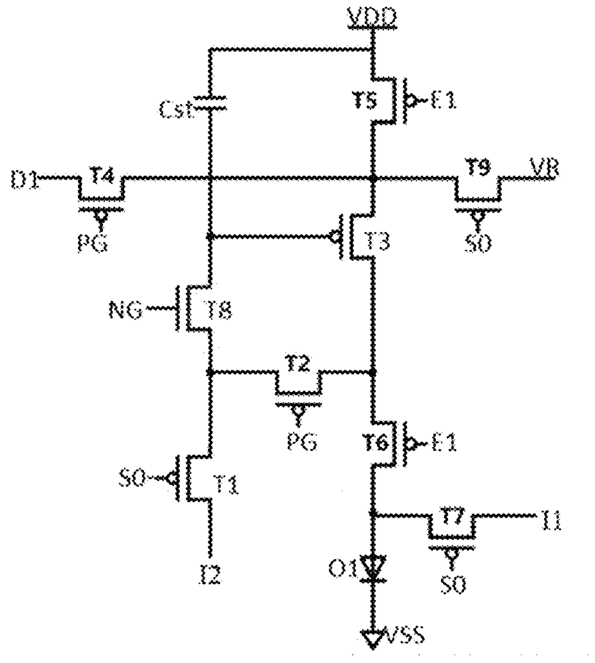
FIG. 2 is a circuit diagram of the pixel circuit in the display device according to at least one embodiment of the present disclosure.

As shown in FIG. 2, on the basis of the pixel circuit in FIG. 1, the second resetting circuit includes a first transistor T1, the compensation control circuit includes a second transistor T2, the driving circuit includes a third transistor T3, the data written-in circuit includes a fourth transistor T4, the light-emission control circuit includes a fifth transistor T5 and a sixth transistor T6, the first resetting circuit includes a seventh transistor T7, the on-off control circuit includes an eighth transistor T8, and the set circuit includes a ninth transistor T9, the energy storage circuit includes a storage capacitor Cst, and the light-emitting element is an organic light-emitting diode O1.

A gate electrode of T1 is electrically connected to the scanning terminal S0, a source electrode of T1 is electrically connected to the second initial voltage terminal I2, and a drain electrode of T1 is electrically connected to the connection node J1.

A gate electrode of T2 is electrically connected to a first control terminal PG, a source electrode of T2 is electrically connected to the connection node J1, and a drain electrode of T2 is electrically connected to a drain electrode of T3.

A gate electrode of T3 is electrically connected to a first terminal of the Cst.

A gate electrode of T4 is electrically connected to the first control terminal PG, a source electrode of T4 is electrically connected to the data line D1, and a drain electrode of T4 is electrically connected to a source electrode of T3.

A gate electrode of T5 is electrically connected to the light-emission control terminal E1, a source electrode of T5 is electrically connected to the power source voltage terminal VDD, and a drain electrode of T5 is electrically connected to the source electrode of T3.

A gate electrode of T6 is electrically connected to the light-emission control terminal E1, a source electrode of T6 is electrically connected to the drain electrode of T3, and a drain electrode of T6 is electrically connected to an anode of O1. A cathode of O1 is electrically connected to the low voltage terminal VSS.

A gate electrode of the T7 is electrically connected to the scanning terminal S0, a source electrode of the T7 is electrically connected to the first initial voltage terminal I1, and a drain electrode of the T7 is electrically connected to the anode of the O1.

A gate electrode of T8 is electrically connected to the on-off control terminal NG, a source electrode of T8 is electrically connected to the gate electrode of T3, and a drain electrode of T8 is electrically connected to the connection node J1.

A gate electrode of T9 is electrically connected to the scanning terminal S0, a source electrode of T9 is electrically connected to the set voltage terminal VR, and a drain electrode of T9 is electrically connected to the source electrode of T3.

The first terminal of the Cst is electrically connected to the gate electrode of T3, and a second terminal of the Cst is electrically connected to a power source voltage terminal VDD.

In FIG. 2, Vdata is a data voltage corresponding to a gray scale.

In FIG. 2, T8 is an n-type transistor, T1, T2, T3, T4, T5, T6, T7 and T9 are each a p-type transistor. T3 is a driving transistor, T8 is an oxide thin film transistor, and T1, T2, T3, T4, T5, T6, T7 and T9 are each a LTPS (low temperature polysilicon) thin film transistor. However, the present disclosure is not limited thereto.

In FIG. 2, the compensation control terminal PG1 and the written-in control terminal PG2 are the first control terminal PG.

Figure 3:
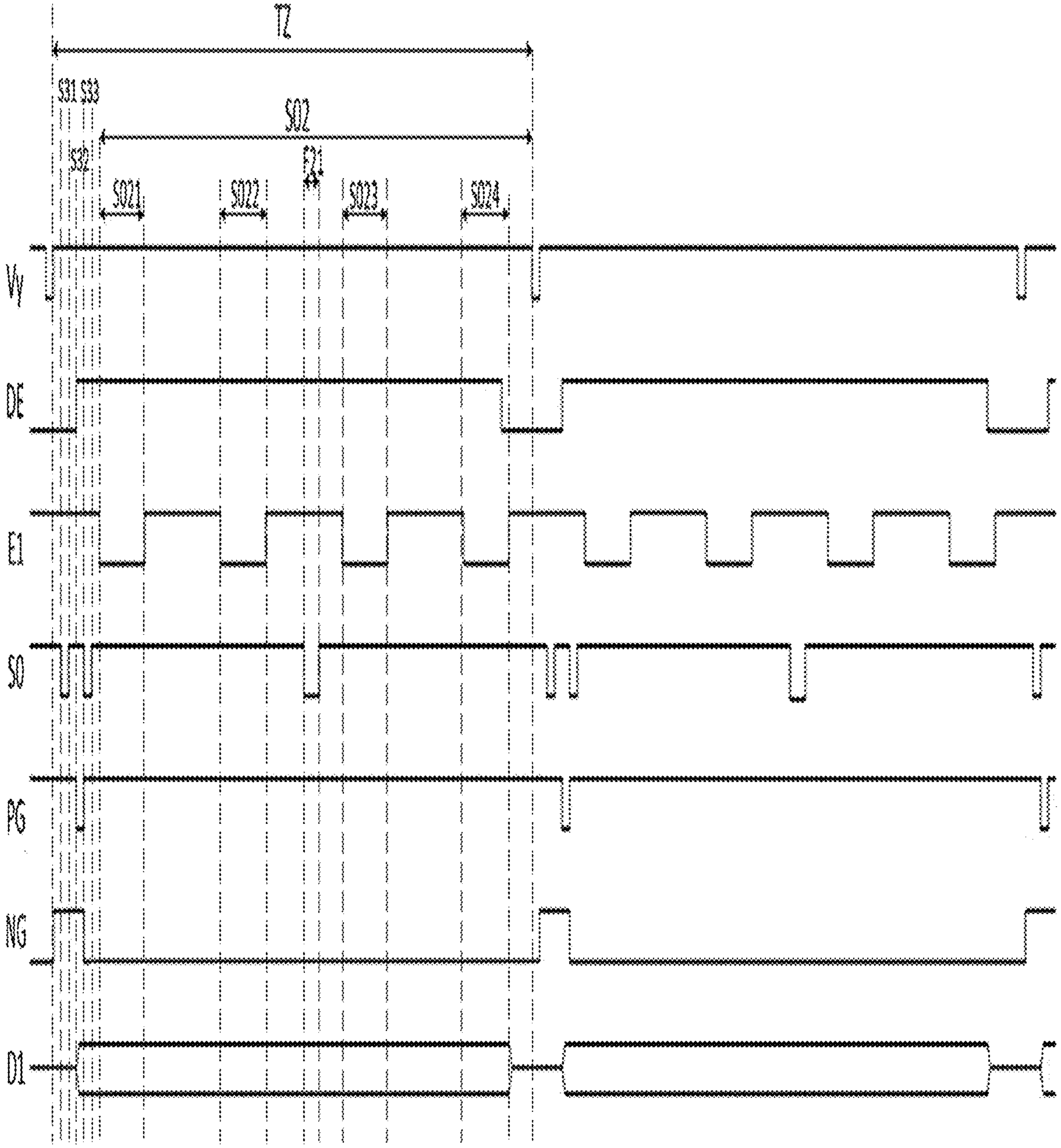
FIG. 3 is a sequence diagram of the pixel circuit in FIG. 2 when a refresh rate is 120 Hz.

FIG. 3 is a sequence diagram of the pixel circuit in FIG. 2 when the refresh rate is 120 Hz. In FIG. 3, TZ denotes the display period.

As shown in FIG. 3, the display period TZ includes a first display time period S31, a second display time period S32, a third display time period S33 and a second light-emission stage S02 arranged one after another.

The second light-emission stage S02 includes a first one S021 of second light-emission time periods, a second one S022 of the second light-emission time periods, a first one F21 of second resetting time periods, a third one S023 of the second light-emission time periods and a fourth one S024 of the second light-emission time periods arranged one after another.

Within the first display time period S31, E1 provides a high voltage signal, S0 provides a low voltage signal, PG provides a high voltage signal, NG provides a high voltage signal, T8 is turned on, T1, T7 and T9 are all turned on, I2 provides the second initial voltage Vi2 to the connection node J1 and the gate electrode of T3, VR provides the set voltage Vref to the source electrode of T3, and I1 provides the first initial voltage Vi1 to the anode of O1.

Within the second display time period S32, E1 provides a high voltage signal, S0 provides a high voltage signal, PG provides a low voltage signal, NG provides a high voltage signal, T4 and T2 are turned on, and T8 is turned on. The data line D1 provides the data voltage Vdata to the source electrode of T3, and the gate electrode of T3 is electrically connected to the drain electrode of T3.

At the beginning of the second display time period S32, T3 is turned on, so as to charge the Cst via the Vdata, thereby to change the potential at the gate electrode of T3 until T3 is turned off, at this time, the potential at the gate electrode of T3 is Vdata+Vth, where Vth is a threshold voltage of T3.

Within the third display time period S33, E1 provides a high voltage signal, S0 provides a low voltage signal, PG provides a high voltage signal, NG provides a low voltage signal, T1, T7 and T9 are all turned on, I1 provides the first initial voltage Vi1 to the anode of O1, and VR provides the set voltage Vref to the source electrode of T3.

Within the first one S021 of the second light-emission time periods, the second one S022 of the second light-emission time periods, the third one S023 of the second light-emission time periods and the fourth one S024 of the second light-emission time periods, E1 provides a low voltage signal, S0 provides a high voltage signal, PG provides a high voltage signal, NG provides a low voltage signal, T5 and T6 are turned on, and T3 drives O1 to emit light.

Within the first one F21 of the second resetting time periods, E1 provides a high voltage signal, S0 provides a low voltage signal, PG provides a high voltage signal, NG provides a low voltage signal, T1, T7 and T9 are all turned on, I2 provides the second initial voltage Vi2 to the connection node J1, VR provides the set voltage Vref to the source electrode of T3, and I1 provides the first initial voltage Vi1 to the anode of O1.

In FIGS. 3 to 7, Vy is a frame sync signal and DE is a data enabling signal.

Figure 4:
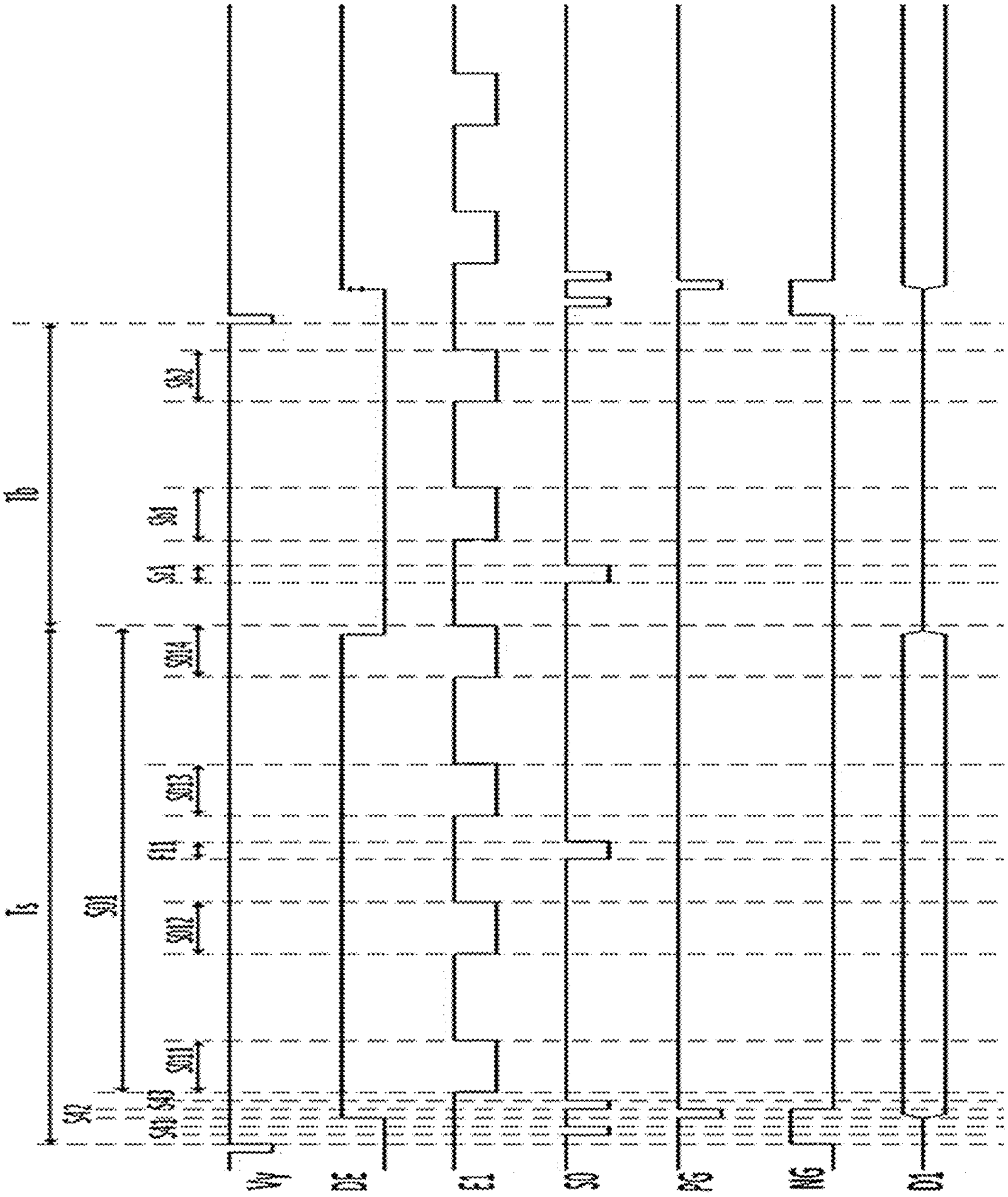
FIG. 4 is a sequence diagram of the pixel circuit in FIG. 2 when the refresh rate is changed from 120 Hz to 80 Hz.

During the operation of the pixel circuit in FIG. 2, when the refresh rate is changed from 120 Hz to 80 Hz, as shown in FIG. 4, the display period may include a refresh stage Ts and a maintaining stage Tb arranged one after another.

The refresh stage Ts includes a first time period S41, a second time period S42, a third time period S43 and a first light-emission stage S01 arranged one after another. The first light-emission stage S01 includes a first one S011 of first light-emission time periods, a second one S012 of the first light-emission time periods, a first one F11 of first resetting time periods, a third one S013 of the first light-emission time periods and a fourth one S04 of the first light-emission time periods arranged one after another.

Within the first time period S41, E1 provides a high voltage signal, S0 provides a low voltage signal, PG provides a high voltage signal, NG provides a high voltage signal, T8 is turned on, T1, T7 and T9 are all turned on, I2 provides the second initial voltage Vi2 to the connection node J1 and the gate electrode of T3, VR provides the set voltage Vref to the source electrode of T3, and I1 provides the first initial voltage Vi1 to the anode of O1.

Within the second time period S42, E1 provides a high voltage signal, S0 provides a high voltage signal, PG provides a low voltage signal, NG provides a high voltage signal. T4 and T2 are turned on, and T8 is turned on. The data line D1 provides the data voltage Vdata to the source electrode of T3, and the gate electrode of T3 is electrically connected to the drain electrode of T3.

At the beginning of the second time period S42, the T3 is turned on, so as to charge the Cst via the Vdata, thereby to change the potential at the gate electrode of the T3 until the T3 is turned off, at this time, the potential at the gate electrode of the T3 is Vdata+Vth, where Vth is a threshold voltage of the T3.

Within the third time period S43, E1 provides a high voltage signal, S0 provides a low voltage signal, PG provides a high voltage signal, NG provides a low voltage signal, T1, T7 and T9 are all turned on, I1 provides the first initial voltage Vi1 to the anode of O1, and VR provides the set voltage Vref to the source electrode of T3.

Within the first one S011 of the first light-emitting periods, the second one S012 of the first light-emission time periods, the third one S013 of the first light-emission time periods and the fourth one S014 of the first light-emission time periods, E1 provides a low voltage signal, S0 provides a high voltage signal, PG provides a high voltage signal, NG provides a low voltage signal, T5 and T6 are turned on, and T3 drives O1 to emit light.

Within the first one F11 of the first resetting time periods, E1 provides a high voltage signal, S0 provides a low voltage signal, PG provides a high voltage signal, NG provides a low voltage signal, T1, T7 and T9 are all turned on, I2 provides the second initial voltage Vi2 to the connection node J1, VR provides the set voltage Vref to the source electrode of T3, and I1 provides the first initial voltage Vi1 to the anode of O1.

The maintaining stage Tb includes a first set time period Sz1, a first light-emission control time period Sb1 and a second light-emission control time period Sb2 arranged one after another.

Within the first light-emission control time period Sb1 and the second light-emission control time period Sb2, E1 provides a low voltage signal, S0 provides a high voltage signal, PG provides a high voltage signal, NG provides a low voltage signal, T5 and T6 are turned on, T3 drives O1 to emit light, and T1, T2, T4, T7, T8 and T9 are turned off.

Within the first set time period Sz1, E1 provides a high voltage signal, S0 provides a low voltage signal, PG provides a high voltage signal, NG provides a low voltage signal, T1, T7 and T9 are turned on, T2, T3, T4, T5, T6 and T8 are turned off, I2 provides the second initial voltage Vi2 to the connection node J1, VR provides the set voltage Vref to the source electrode of T3, and I1 provides the first initial voltage Vi1 to the anode of O1.

As shown in FIG. 4, at the maintaining stage Tb, the quantity of light-emission control time periods is twice the quantity of set time periods.

As shown in FIGS. 3 and 4, within the refresh stage Ts and the display period TZ, light-emission control signals from E1 have the same waveform, scanning signals from S0 have the same waveform, first control signals from PG have the same waveform, and on-off control signals from NG have the same waveform.

As shown in FIG. 3 and FIG. 4, two light-emission control pulses and one scanning pulse are inserted into the maintaining stage Tb, so as to prolong the time of one frame. As a result, each control signal within the refresh stage when the refresh rate is changed from 120 Hz to 80 Hz has a same sequence as each control signal in the display period when the refresh rate is 120 Hz, so as to use a same gamma setting, ensure that there is little or no change in the brightness, and mitigate the flicker phenomenon during the switching of the refresh rate.

Figure 5:
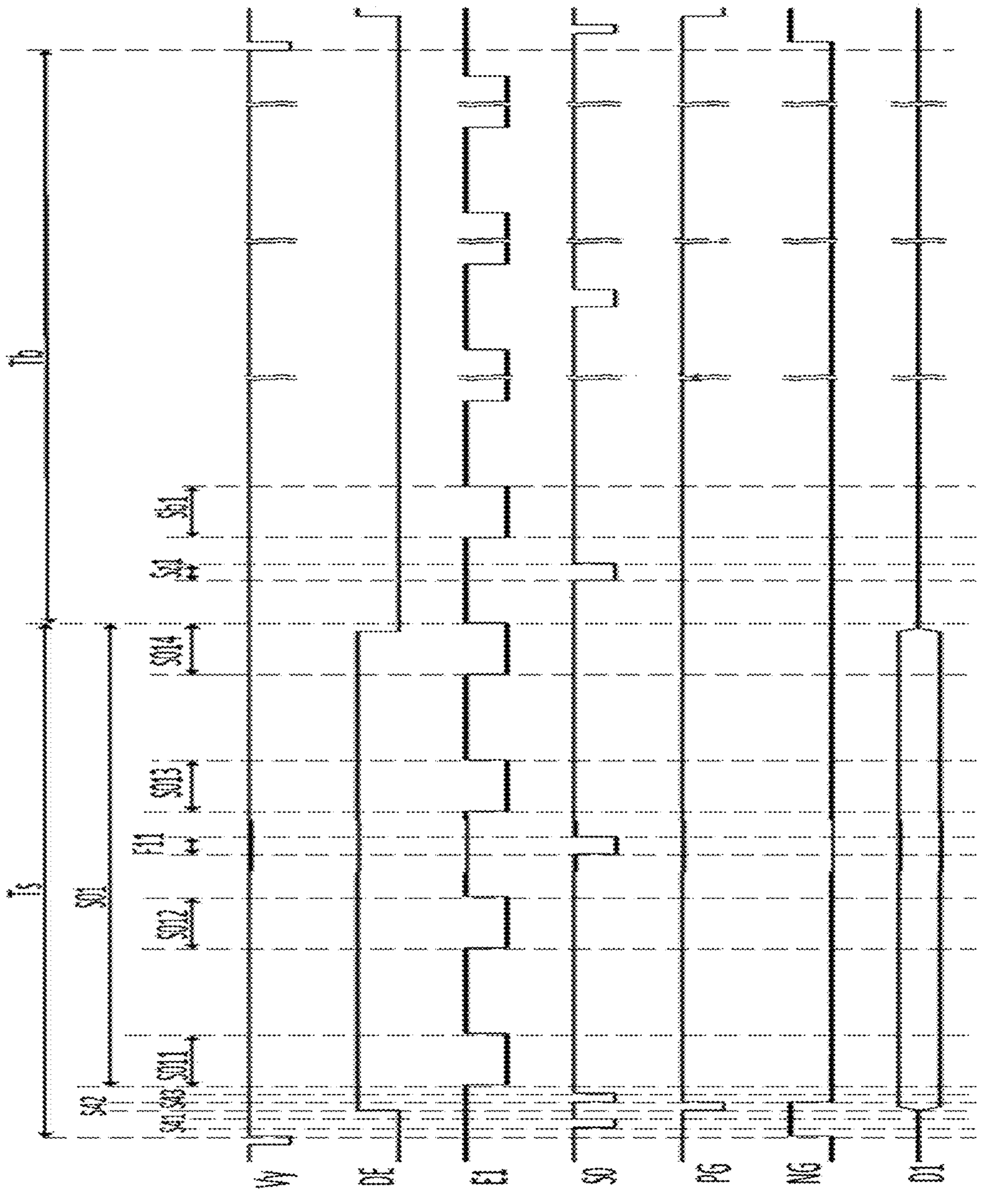
FIG. 5 is a sequence diagram of the pixel circuit in FIG. 2 when the refresh rate is changed from 120 Hz to 30 Hz.

During the operation of the pixel circuit in FIG. 2, when the refresh rate is changed from 120 Hz to 30 Hz, as shown in FIG. 5, the display period may include a refresh stage Ts and a maintaining stage Tb arranged one after another.

The refresh stage Ts includes a first time period S41, a second time period S42, a third time period S43 and a first light-emission stage S01 arranged one after another. The first light-emission stage S01 includes a first one S011 of first light-emission time periods, a second one S012 of the first light-emission time periods, a first one F11 of first resetting time periods, a third one S013 of the first light-emission time periods and a fourth one S04 of the first light-emission time periods arranged one after another.

Within the first time period S41, E1 provides a high voltage signal, S0 provides a low voltage signal, PG provides a high voltage signal, NG provides a high voltage signal. T8 is turned on, T1, T7 and T9 are all turned on, I2 provides the second initial voltage Vi2 to the connection node J1 and the gate electrode of T3, VR provides the set voltage Vref to the source electrode of T3, and I1 provides the first initial voltage Vi1 to the anode of O1.

Within the second time period S42, E1 provides a high voltage signal, S0 provides a high voltage signal, PG provides a low voltage signal, NG provides a high voltage signal, T4 and T2 are turned on, and T8 is turned on. The data line D1 provides the data voltage Vdata to the source electrode of T3, and the gate electrode of T3 is electrically connected to the drain electrode of T3.

At the beginning of the second time period S42, the T3 is turned on, so as to charge the Cst via the Vdata, thereby to change the potential at the gate electrode of the T3 until the T3 is turned off, at this time, the potential at the gate electrode of the T3 is Vdata+Vth, where Vth is a threshold voltage of the T3.

Within the third time period S43, E1 provides a high voltage signal, S0 provides a low voltage signal, PG provides a high voltage signal, NG provides a low voltage signal, T1, T7 and T9 are all turned on, I1 provides the first initial voltage Vi1 to the anode of O1, and VR provides the set voltage Vref to the source electrode of T3.

Within the first one S011 of the first light-emitting periods, the second one S012 of the first light-emission time periods, the third one S013 of the first light-emission time periods and the fourth one S014 of the first light-emission time periods, E1 provides a low voltage signal, S0 provides a high voltage signal, PG provides a high voltage signal, NG provides a low voltage signal, T5 and T6 are turned on, and T3 drives O1 to emit light.

Within the first one F11 of the first reset time periods, E1 provides a high voltage signal, S0 provides a low voltage signal, PG provides a high voltage signal, NG provides a low voltage signal, T1, T7 and T9 are all turned on, I2 provides the second initial voltage Vi2 to the connection node J1, VR provides the set voltage Vref to the source electrode of T3, and I1 provides the first initial voltage Vi1 to the anode of O1.

The maintaining stage Tb includes a first set time period Sz1, a first light-emission control time period Sb1, a second light-emission control time period, a second set time period, a third light-emission control time period, a fourth light-emission control time period, a third set time period, a fifth light-emission control time period, a sixth light-emission control time period, a fourth set time period, a seventh light-emission control time period, an eighth light-emission control time period, a fifth set time period, a ninth light-emission control time period, a tenth light-emission control time period, a sixth set time period, an eleventh light-emission control time period and a twelfth light-emission control time period arranged one after another.

Within the first set time period Sz1, the second set time period, the third set time period, the fourth set time period, the fifth set time period and the sixth set time period, E1 provides a high voltage signal, S0 provides a low voltage signal, PG provides a high voltage signal, NG provides a low voltage signal, T1, T7 and T9 are turned on, T2, T3, T4, T5, T6 and T8 are turned off, I2 provides the second initial voltage Vi2 to the connection node J1, VR provides the set voltage Vref to the source electrode of T3, and I1 provides the first initial voltage Vi1 to the anode of O1.

Within the first light-emission control time period Sb1, the second light-emission control time period, the third light-emission control time period, the fourth light-emission control time period, the fifth light-emission control time period, the sixth light-emission control time period, the seventh light-emission control time period, the eighth light-emission control time period, the ninth light-emission control time period, the tenth light-emission control time period, the eleventh light-emission control time period and the twelfth light-emission control time period, E1 provides a low voltage signal, S0 provides a high voltage signal, PG provides a high voltage signal, NG provides a low voltage signal, T5 and T6 are turned on, T3 drives O1 to emit light, T1, T2, T4, T7, T8 and T9 are turned off.

In FIG. 5, the quantity of light-emission control time periods is twice the quantity of set time periods.

In FIG. 5, due to an insufficient lateral length, time periods apart from the first set time period Sz1 and the first light-emission control time period Sb1 are not numbered, and all time periods apart from the first set time period Sz1 and the first light-emission control time period Sb1 are not shown.

Figure 6:
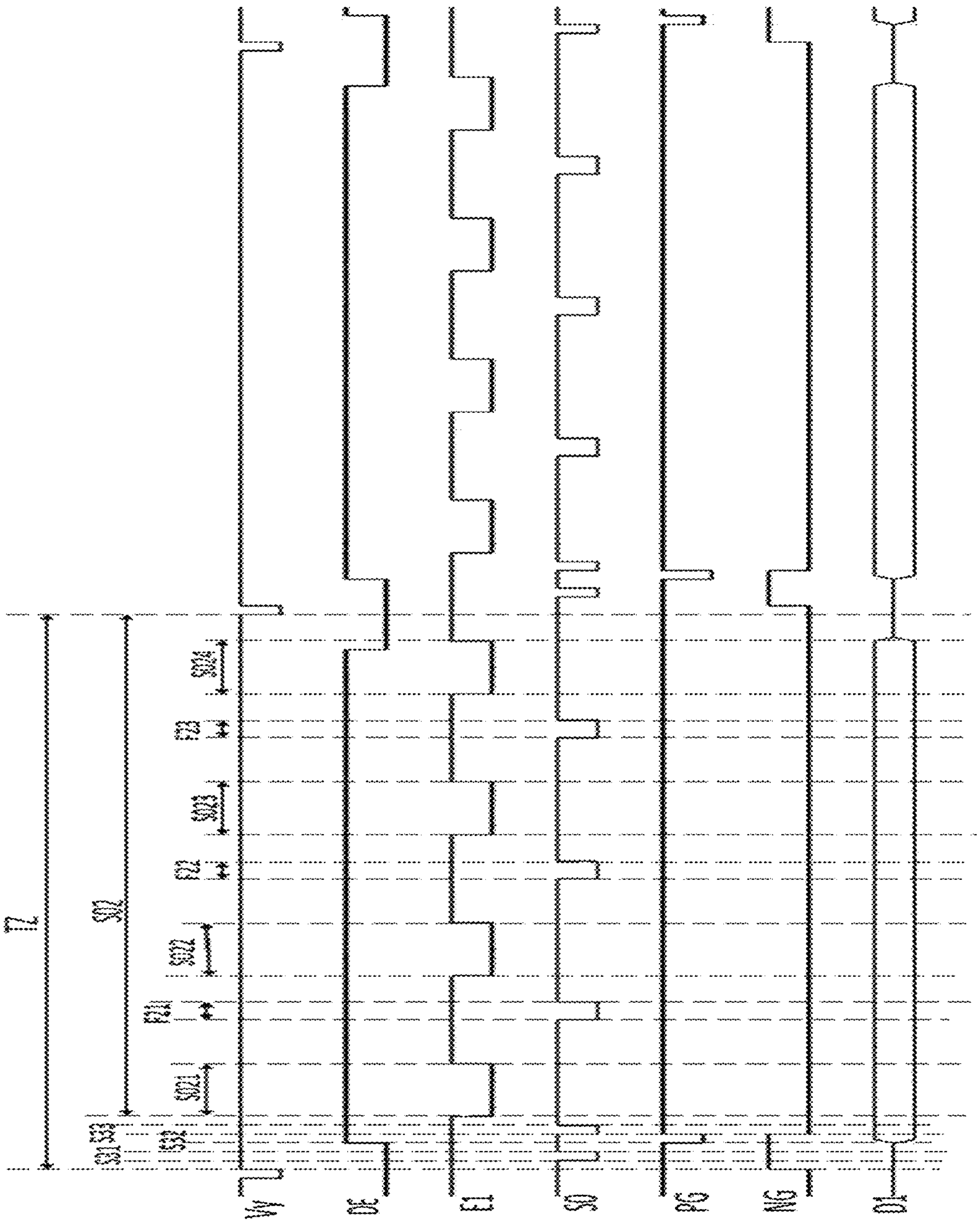
FIG. 6 is another sequence diagram of the pixel circuit in FIG. 2 when the refresh rate is 120 Hz.

FIG. 6 is another sequence diagram of the pixel circuit in FIG. 2 when the refresh rate is 120 Hz. In FIG. 6, TZ denotes the display period.

As shown in FIG. 6, when the refresh rate is 120 Hz, the display period TZ includes a first display time period S31, a second display time period S32, a third display time period S33 and a second light-emission stage S02 arranged one after another.

The second light-emission stage S02 includes a first one S021 of second light-emission time periods, a first one F21 of second resetting time periods, a second one S022 of the second light-emission time periods, a second one F22 of the second resetting time periods, a third one S023 of the second light-emission time periods, a third one F23 of the second resetting time periods and a fourth one S024 of the second light-emission time periods arranged one after another.

Within the first display time period S31, E1 provides a high voltage signal, S0 provides a low voltage signal, PG provides a high voltage signal, NG provides a high voltage signal, T8 is turned on, T1, T7 and T9 are all turned on, I2 provides the second initial voltage Vi2 to the connection node J1 and the gate electrode of T3, VR provides the set voltage Vref to the source electrode of T3, and I1 provides the first initial voltage Vi1 to the anode of O1.

Within the second display time period S32, E1 provides a high voltage signal, S0 provides a high voltage signal, PG provides a low voltage signal, NG provides a high voltage signal, T4 and T2 are turned on, and T8 is turned on. The data line D1 provides the data voltage Vdata to the source electrode of T3, and the gate electrode of T3 is electrically connected to the drain electrode of T3.

At the beginning of the second display time period S32, T3 is turned on, so as to charge the Cst via the Vdata, thereby to change the potential at the gate electrode of T3 until T3 is turned off, at this time, the potential at the gate electrode of T3 is Vdata+Vth, where Vth is a threshold voltage of T3.

Within the third display time period S33, E1 provides a high voltage signal, S0 provides a low voltage signal, PG provides a high voltage signal, NG provides a low voltage signal, T1, T7 and T9 are all turned on, I1 provides the first initial voltage Vi1 to the anode of O1, and VR provides the set voltage Vref to the source electrode of T3.

Within the first one S021 of the second light-emission time periods, the second one S022 of the second light-emission time periods, the third one S023 of the second light-emission time periods and the fourth one S024 of the second light-emission time periods, E1 provides a low voltage signal, S0 provides a high voltage signal, PG provides a high voltage signal, NG provides a low voltage signal, T5 and T6 are turned on, and T3 drives O1 to emit light.

Within the first one F21 of the second resetting time periods, the second one F22 of the second resetting time periods, and a third one F23 of the second resetting time periods, E1 provides a high voltage signal, S0 provides a low voltage signal, PG provides a high voltage signal, NG provides a low voltage signal, T1, T7 and T9 are all turned on, I2 provides the second initial voltage Vi2 to the connection node J1, VR provides the set voltage Vref to the source electrode of T3, and I1 provides the first initial voltage Vi1 to the anode of O1.

Figure 7:
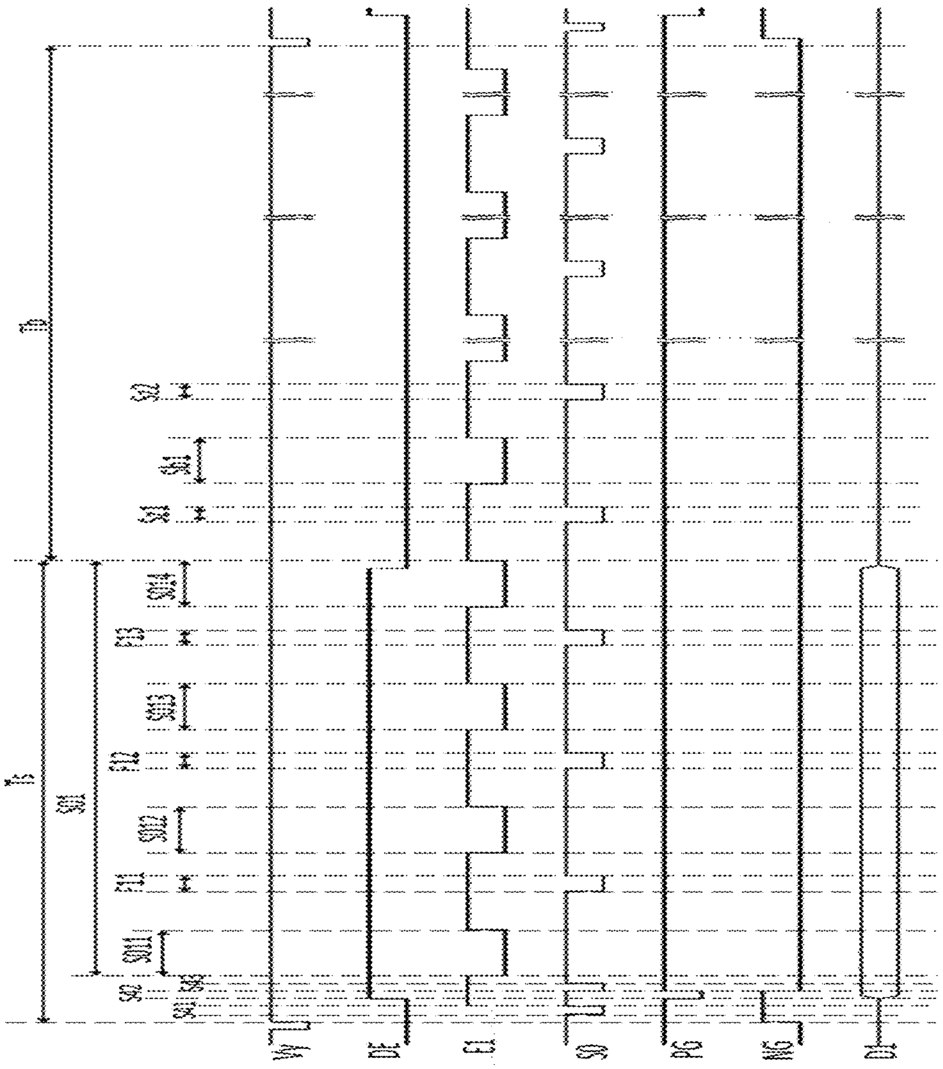
FIG. 7 is another sequence diagram of the pixel circuit in FIG. 2 when the refresh rate is changed from 120 Hz to 30 Hz.

During the operation of the pixel circuit in FIG. 2, when the refresh rate is changed from 120 Hz to 30 Hz, as shown in FIG. 7, the display period may include a refresh stage Ts and a maintaining stage Tb arranged one after another.

The refresh stage Ts includes a first time period S41, a second time period S42, a third time period S43 and a first light-emission stage S01 arranged one after another. The first light-emission stage S01 includes a first one S011 of first light-emission time periods, a first one F11 of first resetting time periods, a second one S012 of the first light-emission time periods, a second one F12 of the first resetting time periods, a third one S013 of the first light-emission time periods, a third one F13 of the first resetting time periods and a fourth one S04 of the first light-emission time periods arranged one after another.

Within the first time period S41, E1 provides a high voltage signal, S0 provides a low voltage signal, PG provides a high voltage signal, NG provides a high voltage signal. T8 is turned on, T1, T7 and T9 are all turned on, I2 provides the second initial voltage Vi2 to the connection node J1 and the gate electrode of T3, VR provides the set voltage Vref to the source electrode of T3, and I1 provides the first initial voltage Vi1 to the anode of O1.

Within the second time period S42, E1 provides a high voltage signal, S0 provides a high voltage signal, PG provides a low voltage signal, NG provides a high voltage signal, T4 and T2 are turned on, and T8 is turned on. The data line D1 provides the data voltage Vdata to the source electrode of T3, and the gate electrode of T3 is electrically connected to the drain electrode of T3.

At the beginning of the second time period S42, the T3 is turned on, so as to charge the Cst via the Vdata, thereby to change the potential at the gate electrode of the T3 until the T3 is turned off, at this time, the potential at the gate electrode of the T3 is Vdata+Vth, where Vth is a threshold voltage of the T3.

Within the third time period S43, E1 provides a high voltage signal, S0 provides a low voltage signal, PG provides a high voltage signal, NG provides a low voltage signal, T1, T7 and T9 are all turned on, I1 provides the first initial voltage Vi1 to the anode of O1, and VR provides the set voltage Vref to the source electrode of T3.

Within the first one S011 of the first light-emitting periods, the second one S012 of the first light-emission time periods, the third one S013 of the first light-emission time periods and the fourth one S014 of the first light-emission time periods, E1 provides a low voltage signal, S0 provides a high voltage signal, PG provides a high voltage signal, NG provides a low voltage signal, T5 and T6 are turned on, and T3 drives O1 to emit light.

Within the first one F11 of the first resetting time periods, the second one F12 of the first resetting time periods and the third one F13 of the first resetting time periods, E1 provides a high voltage signal, S0 provides a low voltage signal, PG provides a high voltage signal, NG provides a low voltage signal, T1, T7 and T9 are all turned on, I2 provides the second initial voltage Vi2 to the connection node J1, VR provides the set voltage Vref to the source electrode of T3, and I1 provides the first initial voltage Vi1 to the anode of O1.

The maintaining stage Tb includes a first set time period Sz1, a first light-emission control time period Sb1, a second set time period Sz2, a second light-emission control time period, a third set time period, a third light-emission control time period, a fourth set time period, a fourth light-emission control time period, a fifth set time period, a fifth light-emission control time period, a sixth set time period, a sixth light-emission control time period, a seventh set time period, a seventh light-emission control time period, an eighth set time period, an eighth light-emission control time period, a ninth set time period, a ninth light-emission control time period, a tenth set time period, a tenth light-emission control time period, an eleventh set time period, an eleventh light-emission control time period, a twelfth set time period and a twelfth light-emission control time period arranged one after another.

Within the first set time period Sz1, the second set time period Sz2, the third set time period, the fourth set time period, the fifth set time period, the sixth set time period, the seventh set time period, the eighth set time period, the ninth set time period, the tenth set time period, the eleventh set time period and the twelfth set time period, E1 provides a high voltage signal, S0 provides a low voltage signal, PG provides a high voltage signal, NG provides a low voltage signal, T1, T7 and T9 are turned on, T2, T3, T4, T5, T6 and T8 are turned off, I2 provides the second initial voltage Vi2 to the connection node J1, VR provides the set voltage Vref to the source electrode of T3, and I1 provides the first initial voltage Vi1 to the anode of O1.

Within the first light-emission control time period Sb1, the second light-emission control time period, the third light-emission control time period, the fourth light-emission control time period, the fifth light-emission control time period, the sixth light-emission control time period, the seventh light-emission control time period, the eighth light-emission control time period, the ninth light-emission control time period, the tenth light-emission control time period, the eleventh light-emission control time period and the twelfth light-emission control time period, E1 provides a low voltage signal, S0 provides a high voltage signal, PG provides a high voltage signal, NG provides a low voltage signal, T5 and T6 are turned on, T3 drives O1 to emit light, T1, T2, T4, T7, T8 and T9 are turned off.

In FIG. 7, the quantity of light-emission control time periods is equal to the quantity of set time periods.

In FIG. 7, due to an insufficient lateral length, time periods apart from the first set time period Sz1, the first light-emission control time period Sb1 and the second set time period Sz2 are not numbered, and all time periods apart from the first set time period Sz1, the first light-emission control time period Sb1 and the second set time period Sz2 are not shown.

FIGS. 8 and 9 each shows a correspondence table between the quantities of scanning signal pulses and the quantities of light-emission control signal pulses inserted into the maintaining stage and the refresh rates.

In at least one embodiment of the present disclosure, when the refresh rate is 120 Hz, four downward light-emission control signal pulses are arranged in one frame, as shown in FIG. 8, the refresh rate is decreased in the following manners.

When 2 light-emission control signal pulses and 1 scanning signal pulse are inserted into the maintaining stage, the refresh rate becomes 80 Hz.

When 4 light-emission control signal pulses and 2 scanning signal pulses are inserted into the maintaining stage, the refresh rate becomes 60 Hz.

When 6 light-emission control signal pulses and 3 scanning signal pulses are inserted into the maintaining stage, the refresh rate becomes 48 Hz.

When 8 light-emission control signal pulses and 4 scanning signal pulses are inserted into the maintaining stage, the refresh rate becomes 40 Hz.

When 10 light-emission control signal pulses and 5 scanning signal pulses are inserted into the maintaining stage, the refresh rate becomes 34.29 Hz.

When 12 light-emission control signal pulses and 6 scanning signal pulses are inserted into the maintaining stage, the refresh rate becomes 30 Hz.

When 14 light-emission control signal pulses and 7 scanning signal pulses are inserted into the maintaining stage, the refresh rate becomes 26.67 Hz.

When 16 light-emission control signal pulses and 8 scanning signal pulses are inserted into the maintaining stage, the refresh rate becomes 24 Hz.

When 18 light-emission control signal pulses and 9 scanning signal pulses are inserted into the maintaining stage, the refresh rate becomes 21.82 Hz.

When 20 light-emission control signal pulses and 10 scanning signal pulses are inserted into the maintaining stage, the refresh rate becomes 20 Hz.

When 22 light-emission control signal pulses and 11 scanning signal pulses are inserted into the maintaining stage, the refresh rate becomes 18.46 Hz.

When 24 light-emission control signal pulses and 12 scanning signal pulses are inserted into the maintaining stage, the refresh rate becomes 17.14 Hz.

When 26 light-emission control signal pulses and 13 scanning signal pulses are inserted into the maintaining stage, the refresh rate becomes 16 Hz.

When 28 light-emission control signal pulses and 14 scanning signal pulses are inserted into the maintaining stage, the refresh rate becomes 15 Hz.

When 30 light-emission control signal pulses and 15 scanning signal pulses are inserted into the maintaining stage, the refresh rate becomes 14.12 Hz.

When 32 light-emission control signal pulses and 16 scanning signal pulses are inserted into the maintaining stage, the refresh rate becomes 13.33 Hz.

When 34 light-emission control signal pulses and 17 scanning signal pulses are inserted into the maintaining stage, the refresh rate becomes 12.63 Hz.

When 36 light-emission control signal pulses and 18 scanning signal pulses are inserted into the maintaining stage, the refresh rate becomes 12 Hz.

When 38 light-emission control signal pulses and 19 scanning signal pulses are inserted into the maintaining stage, the refresh rate becomes 11.43 Hz.

When 40 light-emission control signal pulses and 20 scanning signal pulses are inserted into the maintaining stage, the refresh rate becomes 10.91 Hz.

When 42 light-emission control signal pulses and 21 scanning signal pulses are inserted into the maintaining stage, the refresh rate becomes 10.43 Hz.

When 44 light-emission control signal pulses and 22 scanning signal pulses are inserted into the maintaining stage, the refresh rate becomes 10 Hz.

When 1 light-emission control signal pulse and 1 scanning signal pulse are inserted into the maintaining stage, the refresh rate becomes 96 Hz.

When 2 light-emission control signal pulses and 2 scanning signal pulses are inserted into the maintaining stage, the refresh rate becomes 80 Hz.

When 3 light-emission control signal pulses and 3 scanning signal pulses are inserted into the maintaining stage, the refresh rate becomes 68.57 Hz.

When 4 light-emission control signal pulses and 4 scanning signal pulses are inserted into the maintaining stage, the refresh rate becomes 60 Hz.

When 5 light-emission control signal pulses and 5 scanning signal pulses are inserted into the maintaining stage, the refresh rate becomes 53.33 Hz.

When 6 light-emission control signal pulses and 6 scanning signal pulses are inserted into the maintaining stage, the refresh rate becomes 48 Hz.

When 7 light-emission control signal pulses and 7 scanning signal pulses are inserted into the maintaining stage, the refresh rate becomes 43.64 Hz.

When 8 light-emission control signal pulses and 8 scanning signal pulses are inserted into the maintaining stage, the refresh rate becomes 40 Hz.

When 9 light-emission control signal pulses and 9 scanning signal pulses are inserted into the maintaining stage, the refresh rate becomes 36.92 Hz.

When 10 light-emission control signal pulses and 10 scanning signal pulses are inserted into the maintaining stage, the refresh rate becomes 34.29 Hz.

When 11 light-emission control signal pulses and 11 scanning signal pulses are inserted into the maintaining stage, the refresh rate becomes 32 Hz.

When 12 light-emission control signal pulses and 12 scanning signal pulses are inserted into the maintaining stage, the refresh rate becomes 30 Hz.

When 13 light-emission control signal pulses and 13 scanning signal pulses are inserted into the maintaining stage, the refresh rate becomes 28.24 Hz.

When 14 light-emission control signal pulses and 14 scanning signal pulses are inserted into the maintaining stage, the refresh rate becomes 26.67 Hz.

When 15 light-emission control signal pulses and 15 scanning signal pulses are inserted into the maintaining stage, the refresh rate becomes 25.26 Hz.

When 16 light-emission control signal pulses and 16 scanning signal pulses are inserted into the maintaining stage, the refresh rate becomes 24 Hz.

When 17 light-emission control signal pulses and 17 scanning signal pulses are inserted into the maintaining stage, the refresh rate becomes 22.86 Hz.

When 18 light-emission control signal pulses and 18 scanning signal pulses are inserted into the maintaining stage, the refresh rate becomes 21.82 Hz.

When 19 light-emission control signal pulses and 19 scanning signal pulses are inserted into the maintaining stage, the refresh rate becomes 20.87 Hz.

When 20 light-emission control signal pulses and 20 scanning signal pulses are inserted into the maintaining stage, the refresh rate becomes 20 Hz.

When 21 light-emission control signal pulses and 21 scanning signal pulses are inserted into the maintaining stage, the refresh rate becomes 19.2 Hz.

When 22 light-emission control signal pulses and 22 scanning signal pulses are inserted into the maintaining stage, the refresh rate becomes 18.46 Hz.

In at least one embodiment of the present disclosure, when the refresh rate is 120 Hz, 16 downward light-emission control signal pulses are arranged in one frame, as shown in FIG. 9, the refresh rate is decreased in the following manners.

When 1 light-emission control signal pulse and 1 scanning signal pulse are inserted into the maintaining stage, the refresh rate becomes 112.94 Hz.

When 2 light-emission control signal pulses and 2 scanning signal pulses are inserted into the maintaining stage, the refresh rate becomes 106.67 Hz.

When 3 light-emission control signal pulses and 3 scanning signal pulses are inserted into the maintaining stage, the refresh rate becomes 101.05 Hz.

When 4 light-emission control signal pulses and 4 scanning signal pulses are inserted into the maintaining stage, the refresh rate becomes 96 Hz.

When 5 light-emission control signal pulses and 5 scanning signal pulses are inserted into the maintaining stage, the refresh rate becomes 91.43 Hz.

When 6 light-emission control signal pulses and 6 scanning signal pulses are inserted into the maintaining stage, the refresh rate becomes 87.27 Hz.

When 7 light-emission control signal pulses and 7 scanning signal pulses are inserted into the maintaining stage, the refresh rate becomes 83.48 Hz.

When 8 light-emission control signal pulses and 8 scanning signal pulses are inserted into the maintaining stage, the refresh rate becomes 80 Hz.

When 9 light-emission control signal pulses and 9 scanning signal pulses are inserted into the maintaining stage, the refresh rate becomes 76.8 Hz.

When 10 light-emission control signal pulses and 10 scanning signal pulses are inserted into the maintaining stage, the refresh rate becomes 73.85 Hz.

When 11 light-emission control signal pulses and 11 scanning signal pulses are inserted into the maintaining stage, the refresh rate becomes 71.11 Hz.

When 12 light-emission control signal pulses and 12 scanning signal pulses are inserted into the maintaining stage, the refresh rate becomes 68.57 Hz.

When 13 light-emission control signal pulses and 13 scanning signal pulses are inserted into the maintaining stage, the refresh rate becomes 66.21 Hz.

When 14 light-emission control signal pulses and 14 scanning signal pulses are inserted into the maintaining stage, the refresh rate becomes 64 Hz.

When 15 light-emission control signal pulses and 15 scanning signal pulses are inserted into the maintaining stage, the refresh rate becomes 61.94 Hz.

When 16 light-emission control signal pulses and 16 scanning signal pulses are inserted into the maintaining stage, the refresh rate becomes 60 Hz.

When 17 light-emission control signal pulses and 17 scanning signal pulses are inserted into the maintaining stage, the refresh rate becomes 58.18 Hz.

When 18 light-emission control signal pulses and 18 scanning signal pulses are inserted into the maintaining stage, the refresh rate becomes 56.47 Hz.

When 19 light-emission control signal pulses and 19 scanning signal pulses are inserted into the maintaining stage, the refresh rate becomes 54.86 Hz.

When 20 light-emission control signal pulses and 20 scanning signal pulses are inserted into the maintaining stage, the refresh rate becomes 53.33 Hz.

When 21 light-emission control signal pulses and 21 scanning signal pulses are inserted into the maintaining stage, the refresh rate becomes 51.89 Hz.

When 22 light-emission control signal pulses and 22 scanning signal pulses are inserted into the maintaining stage, the refresh rate becomes 50.53 Hz.

When 23 light-emission control signal pulses and 23 scanning signal pulses are inserted into the maintaining stage, the refresh rate becomes 49.23 Hz.

When 24 light-emission control signal pulses and 24 scanning signal pulses are inserted into the maintaining stage, the refresh rate becomes 48 Hz.

Figure 10:
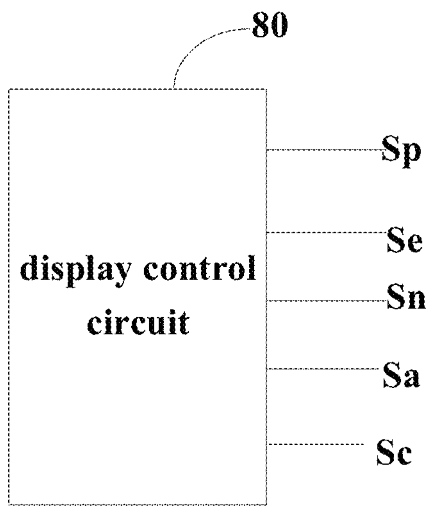
FIG. 10 is a schematic view showing a display control unit according to at least one embodiment of the present disclosure.

The present disclosure provides in some embodiments a display control unit for a display panel. The display panel includes a plurality of pixel circuits arranged in rows, and each pixel circuit includes a light-emission control circuit, a driving circuit and a light-emitting element. A display period of the display panel includes a refresh stage and a maintaining stage arranged one after another in a case where a refresh rate of the display panel is decreased from a first refresh rate to a second refresh rate, the maintaining stage includes one or more light-emission control time periods independent of each other, and, as shown in FIG. 10, the display control unit includes a display control circuit 80.

The display control circuit 80 is configured to, by controlling a written-in control signal Sp, enable the plurality of pixel circuits arranged in rows in the display panel to sequentially receive a corresponding data voltage under the control of the corresponding written-in control signal Sp at the refresh stage.

The display control circuit is further configured to, by controlling the written-in control signal, enable the plurality of pixel circuits arranged in rows in the display panel to stop receiving the corresponding data voltage under the control of the corresponding written-in control signal Sp at the maintaining stage, and by controlling a light-emission control signal Se, enable the light-emission control circuit to control a first terminal of the driving circuit to be electrically connected to a power source voltage terminal and control a second terminal of the driving circuit to be electrically connected to the light-emitting element under the control of the corresponding light-emission control signal Se within each light-emission control time period.

In at least one embodiment of the present disclosure, the pixel circuit further includes an on-off control circuit and a compensation control circuit, the on-off control circuit is electrically connected to an on-off control terminal, a control terminal of the driving circuit and a connection node, and the compensation control circuit is electrically connected to a compensation control terminal, the connection node and the second terminal of the driving circuit.

As shown in FIG. 10, the display control circuit 80 is further configured to, by controlling an on-off control signal Sn and a compensation control signal Sa, enable the on-off control circuit to control the control terminal of the driving circuit to be electrically disconnected from the connection node under the control of the on-off control signal Sn, and enable the compensation control circuit to control the connection node to be electrically disconnected from the second terminal of the driving circuit under the control of the compensation control signal Sa at the maintaining stage.

In at least one embodiment of the present disclosure, the pixel circuit further includes a set circuit and a first resetting circuit, the set circuit is electrically connected to a scanning terminal, a set voltage terminal and the first terminal of the driving circuit, the first resetting circuit is electrically connected to the scanning terminal, a first initial voltage terminal and a first electrode of the light-emitting element, the maintaining stage includes one or more set time periods in the case where the refresh rate of the display panel is decreased from the first refresh rate to the second refresh rate.

As shown in FIG. 10, the display control circuit is further configured to, by controlling the scanning signal Sc, enable the set circuit to write a set voltage from the set voltage terminal into the first terminal of the driving circuit under the control of the scanning signal Sc, and enable the first resetting circuit to write a first initial voltage from the first initial voltage terminal into the first electrode of the light-emitting element under the control of the scanning signal Sc within each set time period.

The present disclosure provides in some embodiments a display device including the above-mentioned display control unit.

In a possible embodiment of the present disclosure, the display device may further include a display panel, the display panel may include a plurality of pixel circuits arranged in rows, and each pixel circuit may have, but not limited to, a structure shown in FIG. 1.

The display device may be any product or member having a display function, e.g., an OLED (organic light-emitting diode) NB (notebook computer), a mobile phone, a tablet computer, a television, a display, a digital photo frame, or a navigator.

In the related art, an OLED NB display screen may be based on LTPO (low temperature poly oxide) backplane technology. LTPO backplane technology combines the advantages of high mobility of LTPS (low-temperature polysilicon) TFT (thin film transistor) and small stop leakage current of Oxide (oxide) TFT, it is able to achieve a lower refresh rate, thereby to significantly reduce the power consumption of the display screen. In the case where the LTPO backplane technology is applied to the OLED NB display screen, and, it is able to match a corresponding refresh rate in different application scenarios, reduce the power consumption and prolong the normal service time of the NB product while improving the user experience.

The aforementioned are optional embodiments of the present disclosure, it should be appreciated that those skilled in the art may make various improvements and modifications without departing from the principle of the present disclosure, and theses improvement and modifications shall fall within the scope of the present disclosure.

What is claimed is:

1. A display control method for a display panel, comprising:

providing the display panel comprising a plurality of pixel circuits arranged in rows, wherein each pixel circuit comprises a light-emission control circuit, a driving circuit and a light-emitting element, wherein a display period of the display panel comprises a refresh stage and a maintaining stage arranged one after another in a case where a refresh rate of the display panel is decreased from a first refresh rate to a second refresh rate, and the maintaining stage comprises one or more light-emission control time periods independent of each other;

at the refresh stage, receiving, by the plurality of pixel circuits arranged in rows in the display panel, a corresponding data voltage sequentially under the control of a corresponding written-in control signal;

at the maintaining stage, stopping receiving, by the plurality of pixel circuits arranged in rows in the display panel, the corresponding data voltage sequentially under the control of the corresponding written-in control signal; and within each light-emission control time period, controlling, by the light-emission control circuit, a first terminal of the driving circuit to be electrically connected to a power source voltage terminal, and controlling a second terminal of the driving circuit to be electrically connected to the light-emitting element under the control of a corresponding light-emission control signal;

wherein an absolute value of a difference between duration of the refresh stage and a first time is less than a predetermined time difference, and the first time is duration of the display period of the display panel when the refresh rate of the display panel is the first refresh rate;

wherein the pixel circuit further comprises a set circuit, a first resetting circuit, a data written-in circuit, an energy storage circuit, a second resetting circuit, an on-off control circuit and a compensation control circuit, the refresh stage comprises a first time period, a second time period, a third time period and a first light-emission stage arranged one after another, the first light-emission stage comprises a first light-emission time period and a first resetting time period independent of each other, and the display control method further comprises:

within the first time period, writing, by the set circuit, a set voltage into the first terminal of the driving circuit under the control of a scanning signal, writing, by the second resetting circuit, a second initial voltage into a connection node under the control of the scanning signal, controlling, by the on-off control circuit, the connection node to be electrically connected to a control terminal of the driving circuit under the control of an on-off control signal, to write the second initial voltage into the control terminal of the driving circuit, and writing, by the first resetting circuit, a first initial voltage into a first electrode of the light-emitting element under the control of the scanning signal;

within the second time period, writing, by the data written-in circuit, the data voltage into the first terminal of the driving circuit under the control of the written-in control signal, controlling, by the compensation control circuit, the connection node to be electrically connected to the second terminal of the driving circuit under the control of a compensation control signal, and controlling, by the on-off control circuit, the connection node to be electrically connected to the control terminal of the driving circuit under the control of the on-off control signal;

at the beginning of the second time period, controlling, by the driving circuit, the first terminal of the driving circuit to be electrically connected to the second terminal of the driving circuit under the control of a potential at the control terminal of the driving circuit, to charge the energy storage circuit via the data voltage, thereby to change the potential at the control terminal of the driving circuit until the driving circuit is turned off;

within the third time period, writing, by the set circuit, the set voltage into the first terminal of the driving circuit under the control of the scanning signal, and writing, by the first resetting circuit, the first initial voltage into the first electrode of the light-emitting element under the control of the scanning signal;

within the first light-emission time period, controlling, by the light-emission control circuit, the first terminal of the driving circuit to be electrically connected to the power source voltage terminal under the control of the corresponding light-emission control signal, and controlling the second terminal of the driving circuit to be electrically connected to the light-emitting element, and driving, by the driving circuit, the light-emitting element to emit light; and within the first resetting time period, writing, by the set circuit, the set voltage from a set voltage terminal into the first terminal of the driving circuit under the control of the scanning signal from a scanning terminal, and writing, by the first resetting circuit, the first initial voltage into the first electrode of the light-emitting element under the control of the scanning signal.

2. The display control method according to claim 1, wherein an absolute value of a difference between a frequency of the light-emission control signal and a first frequency is smaller than a predetermined frequency difference within the refresh stage and the maintaining stage; wherein the first frequency is a frequency of the light-emission control signal in the display period of the display panel when the refresh rate of the display panel is the first refresh rate.

3. The display control method according to claim 2, wherein the frequency of the light-emission control signal is equal to the first frequency within the refresh stage and the maintaining stage.

4. The display control method according to claim 1, wherein the on-off control circuit is electrically connected to an on-off control terminal, the control terminal of the driving circuit and the connection node, the compensation control circuit is electrically connected to a compensation control terminal, the connection node and the second terminal of the driving circuit, and the display control method further comprises:

at the maintaining stage, controlling, by the on-off control circuit, the control terminal of the driving circuit to be electrically disconnected from the connection node under the control of the on-off control signal from the on-off control terminal, and controlling, by the compensation control circuit, the connection node to be electrically disconnected from the second terminal of the driving circuit under the control of the compensation control signal from the compensation control terminal.

5. The display control method according to claim 1, wherein the-first resetting circuit is electrically connected to the scanning terminal, a first initial voltage terminal and the first electrode of the light-emitting element, the maintaining stage comprises one or more set time periods in the case where the refresh rate of the display panel is decreased from the first refresh rate to the second refresh rate, and the display control method further comprises:

within each set time period, writing, by the first resetting circuit, the first initial voltage from the first initial voltage terminal into the first electrode of the light-emitting element under the control of the scanning signal.

6. The display control method according to claim 5, wherein the set circuit is electrically connected to the scanning terminal, the set voltage terminal and the first terminal of the driving circuit, and the display control method further comprises:

within each set time period, writing, by the set circuit, the set voltage from the set voltage terminal into the first terminal of the driving circuit under the control of the scanning signal from the scanning terminal.

7. The display control method according to claim 5, wherein each set time period and each light-emission control time period are independent of each other, and the quantity of light-emission control time periods are N times of the quantity of set time periods, where N is a positive integer.

8. The display control method according to claim 5, wherein light-emission control signals have a same waveform, and scanning signals have a same waveform within the refresh stage and the display period of the display panel when the refresh rate of the display panel is the first refresh rate.

9. The display control method according to claim 1, wherein the duration of the refresh stage is equal to the first time.

10. A display control unit for a display panel, wherein the display panel comprises a plurality of pixel circuits arranged in rows, and each pixel circuit comprises a light-emission control circuit, a driving circuit and a light-emitting element; wherein a display period of the display panel comprises a refresh stage and a maintaining stage arranged one after another in a case where a refresh rate of the display panel is decreased from a first refresh rate to a second refresh rate, the maintaining stage comprises one or more light-emission control time periods independent of each other, and the display control unit comprises a display control circuit;

wherein the display control circuit is configured to, by controlling a written-in control signal, enable the plurality of pixel circuits arranged in rows in the display panel to sequentially receive a corresponding data voltage under the control of the corresponding written-in control signal at the refresh stage;

wherein the display control circuit is further configured to, by controlling the written-in control signal, enable the plurality of pixel circuits arranged in rows in the display panel to stop receiving the corresponding data voltage under the control of the corresponding written-in control signal at the maintaining stage, and, by controlling a light-emission control signal, enable the light-emission control circuit to control a first terminal of the driving circuit to be electrically connected to a power source voltage terminal and control a second terminal of the driving circuit to be electrically connected to the light-emitting element under the control of the corresponding light-emission control signal within each light-emission control time period;

wherein an absolute value of a difference between duration of the refresh stage and a first time is less than a predetermined time difference, and the first time is duration of the display period of the display panel when the refresh rate of the display panel is the first refresh rate;

wherein the pixel circuit further comprises a set circuit, a first resetting circuit, a data written-in circuit, an energy storage circuit, a second resetting circuit, an on-off control circuit and a compensation control circuit, the refresh stage comprises a first time period, a second time period, a third time period and a first light-emission stage arranged one after another, the first light-emission stage comprises a first light-emission time period and a first resetting time period independent of each other;

wherein, within the first time period, the set circuit writes a set voltage into the first terminal of the driving circuit under the control of a scanning signal, the second resetting circuit writes a second initial voltage into a connection node under the control of the scanning signal, the on-off control circuit controls the connection node to be electrically connected to a control terminal of the driving circuit under the control of an on-off control signal, to write the second initial voltage into the control terminal of the driving circuit, and the first resetting circuit writes a first initial voltage into a first electrode of the light-emitting element under the control of the scanning signal;

wherein, within the second time period, the data written-in circuit writes the data voltage into the first terminal of the driving circuit under the control of the written-in control signal, the compensation control circuit controls the connection node to be electrically connected to the second terminal of the driving circuit under the control of a compensation control signal, and the on-off control circuit controls the connection node to be electrically connected to the control terminal of the driving circuit under the control of the on-off control signal;

wherein, at the beginning of the second time period, the driving circuit controls the first terminal of the driving circuit to be electrically connected to the second terminal of the driving circuit under the control of a potential at the control terminal of the driving circuit, to charge the energy storage circuit via the data voltage, thereby to change the potential at the control terminal of the driving circuit until the driving circuit is turned off;

wherein, within the third time period, the set circuit writes the set voltage into the first terminal of the driving circuit under the control of the scanning signal, and the first resetting circuit writes the first initial voltage into the first electrode of the light-emitting element under the control of the scanning signal; and wherein, within the first light-emission time period, the light-emission control circuit controls the first terminal of the driving circuit to be electrically connected to the power source voltage terminal under the control of the corresponding light-emission control signal, and controls the second terminal of the driving circuit to be electrically connected to the light-emitting element, and the driving circuit drives the light-emitting element to emit light; and wherein, within the first resetting time period, the set circuit writes the set voltage from a set voltage terminal into the first terminal of the driving circuit under the control of the scanning signal from a scanning terminal, and the first resetting circuit writes the first initial voltage into the first electrode of the light-emitting element under the control of the scanning signal.

11. The display control unit according to claim 10, wherein the on-off control circuit is electrically connected to an on-off control terminal, the control terminal of the driving circuit and the connection node, and the compensation control circuit is electrically connected to a compensation control terminal, the connection node and the second terminal of the driving circuit;

wherein the display control circuit is further configured to, by controlling the on-off control signal and the compensation control signal, enable the on-off control circuit to control the control terminal of the driving circuit to be electrically disconnected from the connection node under the control of the on-off control signal, and enable the compensation control circuit to control the connection node to be electrically disconnected from the second terminal of the driving circuit under the control of the compensation control signal at the maintaining stage.

12. The display control unit according to claim 10, wherein the set circuit is electrically connected to the scanning terminal, the set voltage terminal and the first terminal of the driving circuit, the first resetting circuit is electrically connected to the scanning terminal, a first initial voltage terminal, and the first electrode of the light-emitting element, the maintaining stage comprises one or more set time periods in the case where the refresh rate of the display panel is decreased from the first refresh rate to the second refresh rate;

wherein the display control circuit is further configured to, by controlling the scanning signal, enable the set circuit to write the set voltage from the set voltage terminal into the first terminal of the driving circuit under the control of the scanning signal, and enable the first resetting circuit to write the first initial voltage from the first initial voltage terminal into the first electrode of the light-emitting element under the control of the scanning signal within each set time period.

13. The display control unit according to claim 12, wherein each set time period and each light-emission control time period are independent of each other, and the quantity of light-emission control time periods are N times of the quantity of set time periods, where N is a positive integer.

14. The display control unit according to claim 12, wherein light-emission control signals have a same waveform, and scanning signals have a same waveform within the refresh stage and the display period of the display panel when the refresh rate of the display panel is the first refresh rate.

15. A display device comprising the display control unit according to claim 10.

16. The display control unit according to claim 10, wherein an absolute value of a difference between a frequency of the light-emission control signal and a first frequency is smaller than a predetermined frequency difference within the refresh stage and the maintaining stage;

wherein the first frequency is a frequency of the light-emission control signal in the display period of the display panel when the refresh rate of the display panel is the first refresh rate.

17. The display control unit according to claim 16, wherein the frequency of the light-emission control signal is equal to the first frequency within the refresh stage and the maintaining stage.

* * * * *